Patented June 23, 1953

2,643,209

UNITED STATES PATENT OFFICE 2,643,209

VITAMIN A ACETATE GELATIN BEADLETS

Edward J. Goett, New York, Edward Everett Macdonough, Jr., Brooklyn, and Charles J. Salivar, Malverne, N. Y., assignors to Chas. Pfizer & Co., Inc., New York, N. Y., a corporation of Delaware No Drawing. Application May 16, 1951,
Serial No. 226,736

3 Claims. (Cl. 167—81)

1

The present invention relates to improved vitamin-containing products, more particularly to a substantially dry vitamin preparation composed of small particles of gelled, colloidal material having dispersed and imprisoned therein a high proportion of crystals of a vitamin A compound.

Compositions have been described previously in which vitamin-bearing oils have been incorporated into fine particles or beadlets of gelatin or similar gelable colloids. Such products are described in the U. S. Patents Nos. 2,183,053, 2,183,084, 2,218,592, and in subsequent patents. However, the compositions described therein had definite limitations. When more than a certain proportion of oil is incorporated as droplets in the interior of gelatin granules or beadlets, there is a definite tendency for the oil to break through on to the surface of the beadlet. This, of course, is undesirable from the standpoint of taste. There is also the very serious problem of the decomposition of the vitamin-containing oil, when exposed to the air on the surface of the beadlet. With the usual commercially available vitamin A-bearing oils, the upper limit that may be obtained for the dried gelatin products is about 300,000 units of vitamin A per gram. If an appreciably higher concentration of the vitamin is used in the beadlets or granules, the oil immediately breaks through on to the surface and forms an unacceptable product. If fairly high proportions of oil are used, there may result a reversal of phase when beadlet formation is attempted.

The main object of this invention is to overcome said drawbacks and to make the vitamin A available in a highly concentrated, stable form. A further object is to insure that the vitaminized beadlets possess adequate crush and abrasion resistance, despite a high proportion of vitamin A, thus providing a convenient form for shipment and storage of the vitamin, which can readily be incorporated in a variety of products, such as pharmaceuticals or foods.

It has now been found that vitamin A may be incorporated into gelatin granules or beadlets at a very much higher level (on the dry, finished basis) than has hitherto been possible. This is accomplished by using in place of the vitamin A-containing oils, a crystalline vitamin A compound, preferably an ester such as the acetate. The latter is available commercially as a substantially pure ester of the vitamin A alcohol melting at about 56–58° C. This crystalline material may be incorporated into gelatin beadlets or granules by methods that will be more fully described below in such proportions that the finished product has a potency of as much as a million units per gram. Other crystalline compounds of vitamin A, such as other esters, may likewise be used, and it is desirable to employ a compound having a melting point appreciably higher than the temperatures which will normally be encountered during the shipment and storage of the product. Despite the high proportion of vitamin, the products of the invention possess excellent mechanical strength. Now, for the first time, the utilization of a highly purified crystalline vitamin A compound has been made possible. Previously it has not been possible to market, for example, crystalline vitamin A acetate because of its very poor stability. Vitamin A oils are often protected by antioxidants.

In carrying out this invention a crystalline form of vitamin A, preferably the acetate, is thoroughly dispersed in an aqueous solution containing gelatin or another gelable colloid, such as gum acacia, pectin, tragacanth, etc., and a sugar-like material, preferably one containing glucose or invert sugar, such as molasses or honey. This aqueous dispersion may then be suspended in an oil, either vegetable or mineral oil (or in a mixture of an oil and a water-miscible solvent), in the form of small droplets of the desired particle size. The dispersion is preferably warmed before the formation of the beadlets, and, after the desired size of droplets has been obtained, the oil suspension is chilled, in order quickly to gel the beadlets. The aqueous dispersion may be heated above the melting point of the solid vitamin A compound, in which case an emulsion of the molten vitamin in the aqueous gelatin solution is obtained. On cooling the suspension of droplets of such emulsion in the oil, in order to gel the beadlets, the vitamin A compound again crystallizes and is imprisoned in finely divided, solid form within the beadlets, thus effectively preventing the high proportion of vitamin that is utilized from escaping to the surface of the beadlets.

The crystalline vitamin is very readily assimilated by animals in this convenient form, in fact, it seems to be more readily absorbed than from beadlets containing vitamin A as an oil. The glucose, honey or other such material serve as a plasticizer, that is they make the gelatin or other colloidal matrix more flexible and prevent cracking and shattering of fine beadlets. They also help to prevent access of the air to the vitamin contained within the beadlets, because the plasticized, gelled colloid has a more closely knit, less porous structure. Furthermore, these plasticizers make the product more palatable and easily digested.

During the preparation of the beadlets and, in particular, while the materials are at an elevated temperature, the stability of the product may be improved by removing the materials from contact with air. This may most easily be done by using a blanket of inert gas, such as carbon dioxide or nitrogen, over the surface of the aqueous dispersion, particularly when the latter is being stirred. For the same purpose, it has been found advisable to use boiled (air free) water in preparing the aqueous solution of gelatin and plasticizer in which the vitamin A compound is dispersed. Once the droplets in the oil have been gelled and at least partially dried, there is no longer any advantage in using a blanket of inert gas over the materials.

After the beadlets or granules have been gelled by cooling, they may be removed from the suspending mineral or vegetable oil by filtration or by other suitable means. The residual oil may be washed from the surface of the granules with a suitable solvent. The small beadlets may then be dried in an atmosphere of suitably low humidity. The beadlets obtained by this procedure are inherently dry and oil-free. It is desirable that this process of drying should be at least partially accomplished by means of suitable water-extracting liquids, such as acetone, ethanol, dioxane or isopropanol, but conducted at a rate such that no strains are set up within the beadlets. These liquids also tend to harden the beadlets and may be added to the cooled oil suspensions of beadlets to assist in "setting" the beadlets and also to assist in their filtration. If the beadlets are dried too rapidly, there is a tendency for them to become case hardened, and often cracking and fragmentation will be encountered. One skilled in the art may readily determine a suitable rate of drying, such that the finished product is one of good mechanical strength. This is particularly important when large volumes of the product are to be shipped or stored. Friction and pressure are apt to abrade and to crush the particles, thereby exposing the vitamin A contents. A feature of the present invention is that the beadlets containing the crystalline vitamin A compound dispersed therein possess ample mechanical strength, despite the high vitamin A potency.

It has been found that certain ranges or proportions of the various ingredients used in the preparation of these compositions are most suitable. The proportion (by weight) of corn syrup, or other suitable gelatin plasticizer of similar water content, to gelatin should be from about 0.4:1 to about 1.5:1. The value of about 0.8:1 seems to be approximately the optimum for this plasticizer. The proportion by weight of water to gelatin should be from about 1.5:1 to about 2.5:1, and the lower part of this range seems to be particularly suitable. The ratio of weight of crystalline vitamin A compound to the total weight of the solid materials (e. g. gelatin + corn syrup + vitamin A compound) may be as high as about 0.40:1 and should be at least about 0.20:1. Of course, lower proportions may be used, but the specific advantage of the new compositions is the very high proportion of vitamin A that may be incorporated therein.

It is to be understood that the various materials specifically mentioned above may be replaced by comparable materials with similar properties, that is, the corn syrup may be replaced by honey or by molasses or by invert sugar syrups of various kinds. The inert oil which is used as a suspending medium in the formation of the vitamin A containing beadlets may also be varied considerably. It may be mineral oil, corn oil, soybean oil, cotton oil, sesame oil or any other such material. The oil should have a viscosity of at least about 100 Saybolt units at room temperature or the beadlets will not form properly when the aqueous gelatin dispersion is stirred into it.

The following examples are given by way of illustration and are not to be considered as limiting this invention, except in so far as such limitation is required by the specific wording of the appended claims.

*Example I*

128 grams of commercially available corn syrup (Corn Products Sales Company—Globe Corn Syrup U* * *, No. 13) were added to 240 mls. of water. The mixture was heated to 65° C. and 160 grams of Pharmagel A, a high-quality pharmaceutical-grade gelatin, were added. The mixture was stirred and heated at 75° C. until a solution was obtained. 102 grams of finely divided, crystalline vitamin A acetate (2,900,000 units per gram) were then added to the solution. The temperature at this point dropped to 65° C. To the resultant mixture were added 480 mls. of mineral oil which had been heated to 65° C. The mixture was agitated until a fine suspension of gelatin globules or droplets in the oil was obtained. The rate of stirring and the type of stirrer may be varied to obtain the desired size particles. When the desired size particles had been obtained, agitation was continued, while the suspension in oil was cooled by means of an ice bath to 10° C. To the chilled suspension were then added 800 mls. of isopropanol which had previously been cooled to 10° C. The mixture was stirred for 5 minutes and the gelled beadlets containing vitamin A were filtered on a Buchner funnel. The product was then added to a liter of isopropanol at 10° C. The mixture was again stirred for 5 minutes and the product was filtered. This served to remove most of the residual oil and also served partially to dehydrate the gelatin granules.

The product was then placed on trays in a low humidity (10–20%) atmosphere at room temperature for 15 to 16 hours. The dried product still retains a slight film of oil on the surface of the particles. The dried product was washed twice with 750-milliliter portions of acetone to complete the dehydration and it was then air dried. Since the particles size is not completely uniform, although a high percentage may be prepared within a fairly uniform particle size range, the product may be screened to remove particularly fine globules.

The product obtained as described above had a vitamin A potency of 700,000 units per gram. It was very suitable for use in the preparation of pharmaceutical products, such as tablets or capsules, either of vitamin A alone or in the form of multi-vitamin preparations. The fine size beadlets were found to be easily incorporated in various enriched foods or in animal feeds allowing for uniform distribution throughout the mixture. The stability and mechanical strength of the product was excellent.

Example II 84 grams of commercially available corn syrup were added to 306 grams of water. The mixture was heated to 65° C. and 204 grams of gelatin in the form of fine granules were added. The mixture was stirred at 75° C. until a solution was obtained. To this solution were added 102 grams of finely divided, crystalline vitamin A acetate. After stirring until a uniform dispersion of the melted vitamin was obtained, 500 mls. of corn oil were added. The mixture was stirred rapidly at 65° C. until uniform globules of gelatin, averaging about 1 mm. in diameter were obtained. The suspension was then cooled to about 5° C. and 800 mls. of precooled isopropanol were added. After stirring for a short time at low temperature, the chilled droplets were filtered, suspended in isopropanol at 10° C., stirred for a short time and refiltered. The product was dried in a low humidity atmosphere and further dehydrated by means of two acetone washes as described in the preceding example. This product contained 700,000 units of vitamin A per gram of dry product.

Example III

A suspension of gelatin beadlets in soybean oil was prepared as previously described. The following materials were used for the preparation of this gelable composition:

| | Grams |
|---|---|
| Gelatin | 180 |
| Honey | 108 |
| Vitamin A acetate | 102 |
| Water | 270 |

After stirring the suspension in oil until a uniform product of the desired particle size had been obtained, the mixture was cooled to set the gelatin beadlets and recrystallize the vitamin A, and the product was isolated, washed and dried as described previously.

Example IV

A composition was prepared containing 40 grams of gelatin, 32 grams of corn syrup, 40 grams of crystalline vitamin A acetate and 100 mls. of water. This mixture was stirred and heated until a uniform dispersion of the vitamin in the aqueous medium was obtained. The dispersion was fed from a dropping funnel in the form of fine droplets into warm mineral oil which was continuously agitated. After all of the aqueous dispersion had been added to the oil, the oil was chilled to gel the vitamin-bearing beadlets. These were removed from the oil, washed and dried by a method similar to that used in the above examples. The product in this case had a potency of about 925,000 units of vitamin A per gram of solids.

Example V

A composition was prepared containing 40 grams of gelatin, 32 grams of honey, 62 grams of vitamin A acetate and 60 mls. of water. The mixture was stirred and heated until a uniform dispersion of vitamin in the aqueous medium was obtained. 300 mls. of mineral oil with a viscosity of about 130 Saybolt units was added to the vitamin dispersion. The mixture was agitated at about 65° C. until fine droplets of the aqueous vitamin dispersion were formed in the oil. The oil was chilled rapidly to gel the beadlets, and the product was removed by filtration. It was washed with cold isopropanol and dried as described previously. A final wash with acetone and redrying completed the process.

The product so obtained consisted of fine beadlets with a high vitamin A potency and marked stability. This material had an assay of about 1,200,000 units of vitamin A per gram of dried product, substantially higher than any product of this nature previously prepared. Nevertheless, it displayed excellent mechanical strength.

Example VI

Boiled, distilled water was cooled to 60° C. and 2690 grams were mixed at this temperature with 1750 grams of gelatin. To the mixture were added 1400 grams of corn syrup while stirring. 834 grams of crystalline vitamin A acetate were then slowly added to the resultant solution which was kept in a closed container under a blanket of nitrogen. The mixture so formed was maintained at 65° C., while being agitated with an Eppenbach-type homogenizer. This homogenizer consists of a turbine-type device in which the liquid is drawn from beneath the apparatus and is passed through a four-blade turbine operating with but a slight clearance in such a manner that there is a strong shearing action on any particles. The melted vitamin A acetate was thereby dispersed throughout the aqueous solution in very finely divided form. After stirring for a short time, the liquid dispersion was allowed to flow through a wide tube and into a cylindrical vessel, closed at the bottom, at the base of whose sides there are cut a series of fine holes. This cylinder was rotated and immersed to about half of its height in 6 gallons of mineral oil which was maintained at 65° C. A device of this type is described in U. S. Patent No. 2,299,929, issued on May 9, 1944 to Raynolds.

The oil used had a viscosity of 180 to 190 Saybolt units. The vessel holding the oil was covered with a tight fitting top and a blanket of nitrogen was maintained within this apparatus. The rotating cylinder into which the mixture was fed served to distribute the aqueous dispersion of vitamin A acetate in the form of fine droplets in the mineral oil. The rotating cylinder also served to agitate the mineral oil and maintain the droplets in suspension. The fine holes through which the aqueous gelatin dispersion was introduced into the oil were 0.006 inch in diameter, and the cylinder itself was 5 inches in diameter. A total time of 13.5 minutes was required to introduce the aqueous dispersion into the warm oil. Immediately after the addition had been completed, the oil was subjected to rapid cooling, so that its temperature dropped to 10° C. over a period of 25 minutes. During the cooling, an extra agitator which consisted of a suitable size propeller was used to stir the oil, thus maintaining the suspension until the droplets gelled. After the mixture had reached 10° C., 2 gallons of isopropanol, precooled to 10° C., were added. Agitation was maintained for 4 minutes more, and the product was then rapidly filtered on a porcelain filter.

The beadlets were washed with 4 liters of isopropanol at 10° C. This was repeated with the same volume of solvent. The product was then dried in a low humidity atmosphere at room temperature for 16 hours. The dried beadlets were given a final wash in a porcelain filter with one gallon of acetone. The product assayed about 550,000 units of vitamin A per gram and, when a sample was passed through a series of standard mesh screens, it was found that about 85% of the product was maintained on screens between 20 and 100 mesh in size.

The oil used as a suspending medium for the formation of the beadlets may be recovered by distilling out the isopropanol and drying before reuse. The isopropanol is simultaneously recovered and must also be dried before reuse.

As many apparently widely different embodiments of this invention may be made without departing from the spirit and scope hereof, it is to be understood that this invention is not limited hereto except as defined in the appended claims.

What is claimed is:

1. Substantially dry oil-free beadlets consisting essentially of gelatin, having dispersed throughout their interiors a high proportion of crystals of vitamin A acetate.

2. A vitamin preparation as claimed in claim 1 wherein the gelatin contains a plasticizer selected from the group consisting of glucose and invert sugar.

3. A vitamin preparation as claimed in claim 1 wherein the vitamin compound constitutes from about 20 to about 40% of the total weight of the beadlets.

EDWARD J. GOETT.
E. EVERETT MACDONOUGH, Jr.
CHARLES J. SALIVAR.

References Cited in the file of this patent

UNITED STATES PATENTS

| Number | Name | Date |
|---|---|---|
| 2,218,592 | Taylor | Oct. 22, 1940 |
| 2,299,929 | Raynolds | Oct. 27, 1942 |
| 2,562,840 | Caldwell | July 31, 1951 |

OTHER REFERENCES

Drug and Cosmetic Industry, volume 66, January 1950, page 33.